United States Patent [19]

Sanchez

[11] Patent Number: 4,660,590
[45] Date of Patent: Apr. 28, 1987

[54] INFLATION PRESSURE REGULATOR

[75] Inventor: George Sanchez, Northridge, Calif.

[73] Assignee: Kenneth E. Berger, Azusa, Calif.

[21] Appl. No.: 895,039

[22] Filed: Aug. 8, 1986

[51] Int. Cl.$^4$ ............................................. F16K 15/20
[52] U.S. Cl. .................................... 137/226; 137/230; 251/360
[58] Field of Search ....................... 137/225, 226, 230; 251/360

[56] References Cited

U.S. PATENT DOCUMENTS 1,724,063  8/1929  Anderson ............................ 137/225

Primary Examiner—Harold W. Weakley
Attorney, Agent, or Firm—Romney Golant Martin Seldon & Ashen

[57] ABSTRACT

An improved inflation pressure regulator is disclosed of the type which automatically releases pressure above a predetermined maximum during inflation of a vehicular tire. The regulator, which is particularly suitable for use with low capacity tires and for use with high capacity air pumps, comprises a generally tubular housing adapted to be coupled between a vehicular tire and a source of compressed air. A substantially friction-free flexing seal arrangement within the housing couples the air source to an exhaust aperture and bypasses the tire when the pressure within the tire reaches a predetermined level. The use of a flexing seal substantially reduces seal wear and thus reduces seal leaks and minimizes variations in the regulator rating over the life of the regulator.

20 Claims, 5 Drawing Figures

INFLATION PRESSURE REGULATOR

FIELD OF THE INVENTION

This invention relates generally to pressure regulators and, more particularly, to devices for automatically limiting tire pressure.

BACKGROUND OF THE INVENTION

Often when inflating tires, means are not readily available for indicating or limiting tire pressure. Some tires, such as those used on bicycles, have relatively small internal volume and extreme caution must be accordingly exercised because maximum pressure can be quickly reached and exceeded.

Inflation of small capacity tires is frequently performed at a service station pump or, alternatively, by means of a hand pump or foot pump. Service station pumps are not particularly suitable for such tires. First, the bellows of such pumps have a relatively large capacity, since they are primarily adapted to fill high capacity tires such as those used on automobiles. Accordingly, a relatively large volume of air is pumped for each "pound" of pressure signified by the bell on most such pumps. The large pump capacity can easily overpower the back pressure inside a small capacity tube and overinflate the tire, sometimes with serious consequence.

Secondly, there is a certain degree of inaccuracy in meters associated with service station pumps. Owing to the large volume of air associated with each "pound" of pressure produced by such pumps, the slight inaccuracies which are tolerable for high capacity tires, are undesirable for low capacity tires.

Accordingly, it is common for users of low capacity tires to inflate the tires with smaller capacity hand pumps and foot pumps. Since a small volume of air is introduced into the tire with each successive pumping motion, the danger of overinflation is decreased. This requires the user to own such a hand or foot pump, is slow, and requires phsyical effort on the part of the user.

In my U.S. Pat. No. 3,994,312 issued Nov. 30, 1976, the contents of which are hereby incorporated by reference, an inflation pressure regulator is disclosed which comprises a tube extending into the hollow interior of a housing. A collar is slidably mounted on the tube and opposingly acted upon by a coiled spring on one side and tire pressure on the other side. The spring biases the collar into a sealing position whereby the pressure source and tire are coupled for inflation of the tire. When the tire pressure exceeds the pressure exerted by the spring, the collar slides against the spring and couples the pressure source to an exhaust aperture in the side of the regulator housing, bypassing the tire.

While the aforementioned regulator provides significant advantages over those which were known in the art, it is an object of the present invention to provide an improved regulator which is suitable for small capacity, high pressure tires such as those used on bicycles, and still suitable for large capacity, low pressure tires. (Although the terms "low pressure" and "high pressure" are relative, those skilled in the art will recognize that "low pressure" typically denotes the 20-40 psi, while "high pressure" denotes 60-150 psi.)

Because only small incremental volumes of air are pumped into tires by hand pumps and foot pumps, it is desirable that an inflation pressure regulator used wth such a pump minimize leakages of the type which occur as seals become worn, thereby maximizing the quantity of air flowing into the tire.

Additionally, the seal of a regulator particularly adapted for small capacity, high pressure tires is subjected to high differential pressure. Accordingly, the seal for such a regulator is vulnerable to leakages which can develop when sliding seals are subject to friction wear over a period of time. It is accordingly desirable to provide a seal arrangement in which wear is minimized, thereby minimizing leakage and increasing the life of the regulator.

SUMMARY OF THE INVENTION

Accordingly, an improved tire inflation regulator is disclosed herein which is particularly suitable for use with low capacity, high pressure tires, although it can be used with other tires as well. The regular comprises a generally tubular housing for coupling a source of pressurized air to the interior of the vehicular tire. The term "interior" is meant to denote the air-containing interior of the tire, whether it be defined by the inner wall of a tubeless tire, or by the inner wall of a tube within a tire.

The regulator housing has a first terminus for connecting to an air hose and defining a first fluid path, a second terminus for connecting to the vehicular tire and defining a second fluid path, and an exhaust aperture.

Means provided within the first terminus are responsive to the stem of an airhose valve for releasibly coupling the tire interior to the pressure source through the regulator housing.

Non-sliding sealing means are provided for dividing the housing interior into first and second chambers. The first chamber communicates with the first and second fluid paths, while the second chamber communicates with the exhaust aperture.

The non-sliding sealing means includes a flexure member within the housing which is fixedly supported at its inner portion for flexing movement of its outer sealing portion relative to its inner portion in response to fluid pressure within the first chamber.

Biasing means are provided for prohibiting the pressure-responsive flexing movement of the outer portion of the flexure member when said pressure is less than a preselected value. The sealing means are responsive to the flexing movement to couple the first and second chambers.

Additional advantages and details concerning the improved regulator will be apparent from the following detailed desription of a preferred embodiment, of which the following drawings are a part.

DETAILED DESCRIPTION OF THE PREFERRED EMBODIMENT

Figure 1:
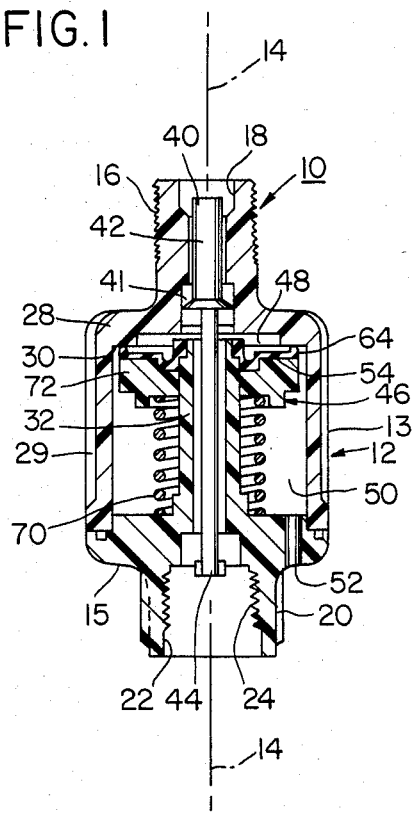
FIG. 1 is a sectional view of an improved inflation pressure regulator constructed in accordance with the invention.

FIG. 1 is a sectional view of an improved inflation pressure regulator 10 constructed in accordance with the invention. The regulator 10 is shown to comprise a generally tubular housing 12 formed from an acetal, such as Delrin TM or Selcon TM, which is substantially impervious to petroleum-based products and keytones. The term "tubular" is used to denote the fact that the housing includes an internal cavity in communication with at least two ports. The housing 12 may be constructed of an upper portion 13 and a lower or base portion 15 which are secured together incident to assembly of the regulator by any suitable fastening means.

The housing 12 is adapted to couple a source of pressurized air to the interior of a vehicular tire. While the regulator 10 is generally cylindrical in appearance and disposed about a central axis 14, those skilled in the art will recognize that the body and cavity can be any of a number of convenient shapes.

In order to couple a source of pressurized air to the interior of a vehicular tire, the housing includes a first upper terminus 16 for engaging an airhose. The first terminus 16 encompasses a first fluid path 18 through which air from the pressurized source flows in a generally axial direction into the housing interior cavity.

A second lower terminus 20 is located at the axially opposite lower end of body 12. The second terminus 20 encompasses a second fluid path 22 in fluid communication with the interior cavity of the housing and adapted to connect to a vehicular tire. Means may be provided for permanently affixing the regulator 10 to the tire in much the same way that tire valves are presently affixed. In the illustrated embodiment, however, the interior of the second terminus 20 is threaded at 24 to screw onto the exterior threads on the valve of the vehicular tire.

In the preferred embodiment, the housing 12 is narrowed at its upper end to provide the first terminus 16 which fits the nozzle of a standard airhose. The housing then has a radially outwardly diverging portion 28 and a relatively enlarged main or body portion 29. The housing 12 is also narrowed at its lower end to provide the lower second terminus 20. Internally, the housing is formed at the upper end of the body portion with a shoulder that faces away from the first terminus 16 and provides a generally flat annular valve seat surface 30. The surface 30, as described below, cooperates with the regulator's seal assembly.

As shown in FIG. 1, a generally upwardly axially extending tube 32, supported by base portion 15, is disposed about the central axis 14. The tube 32 communicates at its lower end with the second fluid path 22. The tube 32 extends concentrically up through the main housing portion 29. The upper end of tube 32 is adjacent to, but spaced from, the lower end of the first fluid path 18 to provide fluid communication between the first fluid path and second fluid path 22. The O.D. of tube 32 is substantially smaller than the I.D. of the main housing portion 29 to define a generally annular space therebetween.

A plunger 40 extends generally axially from the first terminus through the first fluid path 18, tube 32, and into the second fluid path 22. The enlarged upper end 42 of the plunger 40 is positioned to be contacted and pushed downwardly by the stem of an airhose (not shown) which circumvents the first terminus. This causes the lower end 44 of plunger 40 to depress the stem of a tire valve (not shown) that has been threaded into the second terminus 20. This couples the interior of the tire to the pressure source via the body cavity of regulator 10. Tabs or projections at the upper and lower portions of the plunger serve to retain the plunger within the housing, while allowing desired axial movement of the plunger.

In order to permit fluid communication between the first and second fluid paths, the tube 32 passes through the center of a seal assembly 46. The seal assembly 46 extends generally radially from the upper end of the tube 32 to divide the interior of the housing 12 into first and second chambers 48,50. The first chamber 48 communicates directly with the first fluid path 18 and communicates via the tube 32 with the second fluid path 22. The second chamber 50 communicates with an exhaust aperture 52 formed in the lower or base portion 15. The exhaust aperture 52 vents the second chamber 50 to atmosphere. A plurality of such exhaust apertures may be utilized, although only one is illustrated for clarity. Exiting the aperture in this location reduces chances that it will be blocked by the fingers of the user during use of the regulator.

Figure 4:
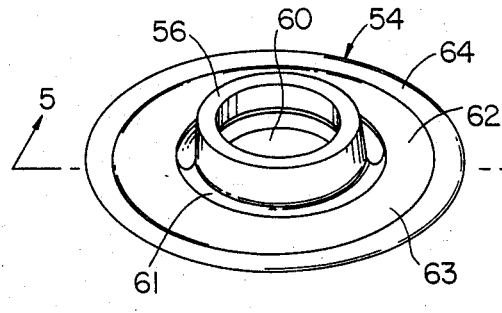
FIG. 4 is an enlarged perspective view of the flexure member of FIG. 1.
Figure 5:
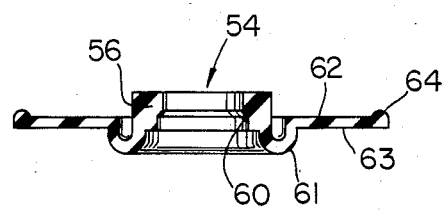
FIG. 5 is a cross-sectional view of the flexure member taken generally along line 5—5 of FIG. 4.

The seal assembly 46, includes a generally disc-shaped diaphragm or flexure member 54 shown in perspective in FIG. 4 and in cross-section in FIG. 5, of a suitable flexible material such as a rubber or a thermolastic. A preferred material is Viton or Buna-N, 70 Durometer, which is operative in the desired temperature range and which is resistant to oil and gasoline products. The flexure member includes a generally central approximately 0.230 inch O.D. hub or central portion 56 which is disposed about the central axis 14 and has a generally central through-hole 60 dimensioned at approximately 0.140 inch I.D. to circumvent the approximately 0.146 inch O.D. upper end of tube 32 with an intereference fit. More particularly the upper end of the tube 32 is of reduced diameter to form an upwardly directed lip; the interior of the hub section 56 has a conforming shape. This holds the hub section in fixed position at the upper end of the tube. The flexure member 54 additionally includes a radially extending annular, outer portion 62, having a flexing section 63 that is approximately 0.20 inch thick, and terminates in a circumferentially disposed annular sealing section 64 having the appearance of an integrally formed 0.30 inch thick, 0.590 inch O.D. O-ring. The flexing section 63 includes a generally flat horizontally extending radially outer area 63 and a radially inward downwardly and axially bowed hing area 61.

Returning to FIG. 1, the flexure member 54 is normally positioned so that the sealing section 64 contacts seat surface 30 to sealingly divide the interior of the housing 12 into first and second chambers 48,50. The sealing section 64 is urged into that sealing position by bias means such as a partially compressed coil spring 70 positioned around the tube 32. The spring 70 acts against the lower surface of a support ring 72 which is slidably disposed on the tube 32 between the spring and the flexure member. The support ring 72 in turn exerts sealing force against the underside of the outer portion 63 and the sealing section 64 of the flexure member. The ring 72 has a radially inward recess to accomodate the bowed area 61 of the flexure member.

Figure 2:
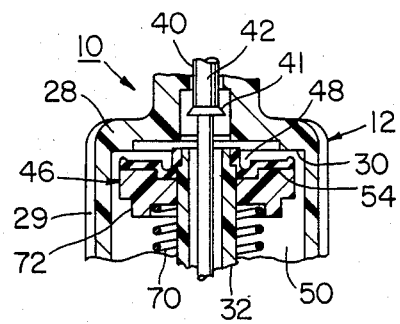
FIG. 2 is a partial seconal view of the regulator of in FIG. 1 showing the sealing means opened.
Figure 3:
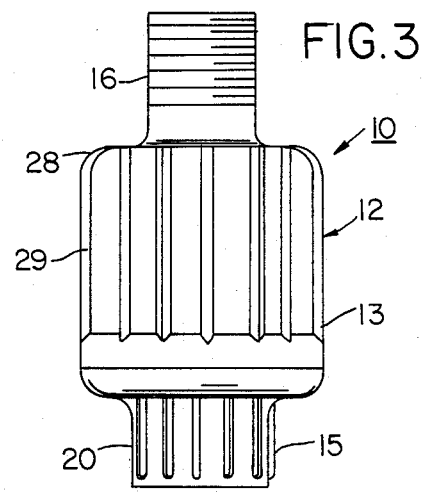
FIG. 3 is a side view of the regulator of FIG. 1.

Opposing the spring force on the flexure member is the pressure in the first chamber 48, which acts upon the upper face of the flexing section 63 of the flexure member 54. As shown in FIG. 2, the flexure member 54 is responsive to pressure in the first chamber 48 to deflect its flexing section 63 generally downwardly about the bowed area 61 and relative to its stationary hub 56 in response to fluid pressure within the first chamber that exceeds the spring force. This compresses spring 70 and slides the support ring 72 axially downwardly. Downward movement of sealing section 64 away from seat surface 30 breaks the seal and permits the first and second chambers to communicate. In operation, the sealing section 64 moves approximately 0.10 inch from the seat surface 30.

As just described, the flexing movement of the member 54 is opposed by bias means such as coil spring 70 positioned within the second chamber 50 to prohibit the pressure-responsive flexing movement when the pressure in the first chamber is less than a preselected value. The preselected value is determined, in part, by the spring constant of spring 70. Further, the force exerted by spring 70 can be made larger or smaller by using support rings of different thicknesses or by adding supplemental rings (not shown).

In operation, the regulator 10 is screwed onto the valve of a tire so that the lower end 44 of plunger 40 lightly contacts the upper end of the valve stem (not shown) associated with the vehicular tire. When an air hose nozzle is pressed over the first terminus 16, its stem (not shown) presses down on plunger 40 to release the stem of the tire valve. Air flows from the pressurized source through the first fluid path 18, the tube 32, and the second fluid path 22 into the tire. The sealing section 64 of flexure member 54 is normally urged into sealing contact with seat surface 30 owing to the force exerted against the flexure member 54 by the spring 70/ring 72 combination. When the tire has been inflated to the pressure rating of the regulator, the pressure in the first chamber 48 will exert sufficient force against the upper face of flexure member 54 to cause a flexing in portion 62 and a consequential movement of the sealing section 64 away from the seat surface 30. The first chamber is consequently placed in communication with the second chamber and thereby vented to atmosphere via the exhaust aperture 52.

The reader will note that the preferred embodiment omits the use of sliding seals which are subject to wear and can cause a change in the maximum inflation pressure permitted by the regulator. Additionally, a worn seal permits a certain amount of air from the pressurized source to be vented prior to the attainment of maximum pressure. While both of these conditions are tolerable when large capacity tires are filled by large capacity pumps such as those found in service station, both consequences are highly undesirable when small capacity tires are inflated by small capacity hand pumps.

As previously indicated, the large bellow capacity of service station air pumps can easily overpower the back pressure in a small capacity tire and cause too rapid an expansion of the tire. Meter valve means for controlling the rate of tire inflation is accordingly provided in the preferred embodiment by restriction, the gap between the plunger end 42 and the exterior wall of the first fluid passage 18 to approximately 0.005 inch. The consequentially restricted air path minimized the risk of overly rapid inflation.

In addition, the plunger 40 has a flared portion 41 at the lower end of the upper end 42. This flared portion 41 deflects air entering the first fluid path 18 and prevents a jet of air from entering the tube 32 and raising the air pressure to the tire to an undesired level, particularly when the supply of air is 150 psi or greater.

While the preceding description has presented, in detail exemplary preferred ways in which the concepts of the present invention may be applied, those skilled in the art will recognize that numerous alternatives encompassing many variations may readily be employed without departing from the spirit and scope of the invention set forth in the appended claims:

I claim:

1. An improved tire inflation regulator comprising:
    a generally tubular housing for placing a source of pressurized air in fluid communication with the interior of a vehicular tire, the housing having a first terminus for connecting to the source of air and defining a first fluid path, a second terminus for connecting to the vehicular tire and defining a second fluid path, and an exhaust aperture;
    means in the first terminus and responsive to being connected to the air source for placing the tire interior in communication with the source through the housing;
    sealing means for dividing the housing interior into first and second chambers, the first chamber being in fluid communication with the first and second fluid paths, the second chamber being in fluid communication with the exhaust aperture;
    said sealing means comprising a flexure member within the housing having a first portion supported in a stationary position and having a second portion constructed and arranged for flexing movement in response to fluid pressure within the first chamber;
    said sealing means also comprising biasing means for prohibiting said pressure-responsive flexing movement of the second portion of the flexure member when said pressure is less than a preselected value;
    the sealing means being responsive to said flexing movement to place the first and second chambers in fluid communication with one another.

2. The regulator of claim 1 wherein said flexure member is generally annular with a central portion and a radially outer portion, said flexure member being supported at its central portion and flexing at its outer portion.

3. The regulator of claim 2 wherein said outer portion comprises a peripheral sealing section and an intermediate flexing section located between said central portion and said sealing section.

4. The regulator of claim 3 wherein said sealing section is enlarged relative to the adjacent flexing section and approximates the configuration of an O-ring.

5. The regulator of claim 4 wherein said flexure member is a single integral part.

6. The regulator of claim 3 wherein said sealing means also comprises an annular sealing surface at the interior of said housing for engaging said sealing section.

7. The regulator of claim 4 wherein said sealing means also comprises a generally flat transverse annular sealing surface at the interior of said housing for engaging said sealing section.

8. The regulator of claim 4 wherein said flexure member is an integral part made of rubber or thermolastic material.

9. An improved tire inflation regulator comprising:
    a generally tubular, cavity-defining housing disposed about a generally central axis for placing a source of pressurized air in fluid communication with the interior of a vehicular tire, the housing having first terminus for connecting to the air source and defining a first fluid path, a second terminus for connecting to the tire and defining a second fluid path, and an exhaust aperture;

a tube within the housing that provides fluid communication between the two fluid paths;

a flexure member extending generally transversely from an open portion of the tube and including a radially outer flexing and sealing section cooperative with the adjacent cavity wall to divide the cavity into first and second chambers, the first chamber communicating with the first and second fluid paths, the second chamber communicating with the exhaust aperture; and biasing means for urging said flexing and sealing section into cooperative engagement with the cavity wall to separate first and second chambers, the flexure member being position within the fluid path to be opposingly acted upon by the biasing means and fluid pressure within the first chamber.

10. The regulator of claim 9 wherein the flexure member is generally disc-shaped and has a generally central through-hole sized to circumvent the tube; the flexure member circumventing the tube.

11. The regulator of claim 10 wherein the inner diameter of the through-hole is sized with respect to the exterior measurement of the tube so that an interference fit is formed between the flexure member and tube.

12. The regulator of claim 11 wherein the tube includes a shoulder for supporting the circumventing flexure member.

13. An improved sealing member for use in a tire inflation regulator, the regulator comprising a generally tubular housing for placing a source of pressurized air in fluid communication with the interior of a vehicular tire, the housing a first terminus for connecting to a source of air and defining a first fluid path, a second terminus for connecting to the vehicular tire and defining a second fluid path, an exhaust aperture, an annular internal seat for cooperating with a sealing member to divide the housing interior into first and second chambers, the first chamber being in fluid communication with the first and second fluid paths, the second chamber being in fluid communication with the exhaust aperture, said regulator also comprising biasing means for prohibiting pressure-responsive movement of the sealing member when the pressure in said first chamber and said tire interior is less than a pre-selected value, but allowing such movement to place the first and second chambers in fluid communication with one another when said pressure reaches said preselected value;

said sealing means comprising a flexure member for being supported within the housing in a stationary position for flexing movement in response to higher fluid pressure within the first chamber, said sealing member being generally annular with a central first portion and a radially outer second flexing and sealing portion, said sealing member being supported at its central portion and flexing at its outer portion, said outer portion comprises a peripheral sealing section and an intermediate flexing section located between said central portion and said sealing section, said sealing section being enlarged relative to the adjacent flexing section and approximating the configuration of an O-ring.

14. The sealing member of claim 13 wherein said sealing member is a single integral part.

15. The sealing member of claim 14 wherein said sealing member is made of a rubber or a thermolastic material.

16. The sealing member of claim 15 wherein said sealing member is made of VITON.

17. The sealing member of claim 13 wherein said flexing section includes a generally flat portion and a bowed hing portion to facilitate the flexing movement.

18. The regulator of claim 3 wherein said flexing section inclues an annular bowed hing area to facilitate the flexing movement.

19. The regulator of claim 1 further comprising a tube leading from the first fluid path of said first terminus to the second fluid path of said second terminus.

20. The regulator of claim 19 wherein said means responsive to said air source comprises a movable plunger having one end disposed at said first fluid path, and extending through said tube to said second fluid path, said plunger having deflector means thereon to deflect the stream of high pressure air from the air source away from direct entry to said tube.

* * * * *